United States Patent
Shingu

(10) Patent No.: US 8,587,677 B2
(45) Date of Patent: Nov. 19, 2013

(54) REMOTE INSTRUCTION SYSTEM, REMOTE INSTRUCTION METHOD, AND PROGRAM PRODUCT THEREFOR

(75) Inventor: Jun Shingu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/137,583

(22) Filed: Aug. 26, 2011

(65) Prior Publication Data

US 2011/0310122 A1 Dec. 22, 2011

Related U.S. Application Data

(62) Division of application No. 11/589,176, filed on Oct. 30, 2006, now abandoned.

(30) Foreign Application Priority Data

Jun. 28, 2006 (JP) ................................ 2006-178281

(51) Int. Cl.
*H04N 5/232* (2006.01)
*H04N 5/225* (2006.01)

(52) U.S. Cl.
USPC ................................ 348/211.12; 348/207.11

(58) Field of Classification Search
None
See application file for complete search history.

(56) References Cited

U.S. PATENT DOCUMENTS

| | | |
|---|---|---|
| 5,473,343 A | 12/1995 | Kimmich et al. |
| 5,767,897 A | 6/1998 | Howell |
| 6,339,431 B1 | 1/2002 | Ohmori et al. |
| 6,392,694 B1 | 5/2002 | Bianchi |
| 6,989,801 B2 | 1/2006 | Bruning |
| 7,224,847 B2 | 5/2007 | Zhang et al. |
| 7,314,283 B2 * | 1/2008 | Tsukada ........................ 353/121 |
| 7,542,055 B2 * | 6/2009 | Matsuda et al. ............... 345/690 |
| 2002/0051001 A1 * | 5/2002 | Kanai ............................ 345/591 |
| 2004/0054295 A1 | 3/2004 | Ramseth |
| 2004/0070674 A1 | 4/2004 | Foote et al. |
| 2004/0239653 A1 * | 12/2004 | Stuerzlinger .................. 345/183 |
| 2007/0234220 A1 | 10/2007 | Khan et al. |
| 2008/0133640 A1 | 6/2008 | Saito et al. |

FOREIGN PATENT DOCUMENTS

| | | |
|---|---|---|
| JP | A-05-225303 | 9/1993 |
| JP | A 2003-209832 | 7/2003 |
| JP | A-2004-220179 | 8/2004 |
| JP | A 2005-033756 | 2/2005 |
| JP | A-2006-041884 | 2/2006 |

OTHER PUBLICATIONS

Office Action dated Dec. 27, 2011 issued in Japanese Patent Application No. JP-2006178281 (with translation).
Khan A. et al., "Spotlight: Directing Users' Attention on Large Displays," CHI 2005, Apr. 2005.

* cited by examiner

*Primary Examiner* — Sinh Tran
*Assistant Examiner* — Jason Flohre
(74) *Attorney, Agent, or Firm* — Oliff & Berridge, PLC

(57) ABSTRACT

A remote instruction system includes an attention image outputting portion that projects an annotation image and an attention image from a projecting portion onto a captured area of an image capturing portion that captures an image of an object, the annotation image being created on the basis of the image captured, the attention image being provided for attracting attention to the annotation image.

7 Claims, 17 Drawing Sheets

10 ATTENTION IMAGE   8 ANNOTATION IMAGE

8 ANNOTATION IMAGE

10 ATTENTION IMAGE

REMOTE INSTRUCTION SYSTEM, REMOTE INSTRUCTION METHOD, AND PROGRAM PRODUCT THEREFOR

This is a Division of application Ser. No. 11/589,176 filed Oct. 30, 2006. The disclosure of the prior application is hereby incorporated by reference herein in its entirety.

BACKGROUND

This invention generally relates to a remote instruction system, by which an instruction can be given to an object from a remote site.

There are systems by which communications are made between remote sites. For example, while an object at a remote site is being captured by a camera and such captured image is being transmitted to a monitoring site at another remote site, a pointer created based on the captured image (hereinafter, referred to as annotation image) is transmitted to the remote site and the annotation image is projected onto the object from a video projector. This allows a monitoring person to give an instruction, by use of the annotation image, not only to a telephone or the captured image but also to detailed portions of the object.

SUMMARY

An aspect of the present invention provides a remote instruction system including an attention image outputting portion that projects an annotation image and an attention image from a projecting portion onto a captured area of an image capturing portion that captures an image of an object, the annotation image being created on the basis of the image captured, the attention image being provided for attracting attention to the annotation image.

BRIEF DESCRIPTION OF THE DRAWINGS

Embodiments of the present invention will be described in detail based on the following figures, wherein.

DETAILED DESCRIPTION OF EMBODIMENTS

A description will now be given, with reference to the accompanying drawings, of exemplary embodiments of the present invention.

Figure 1:
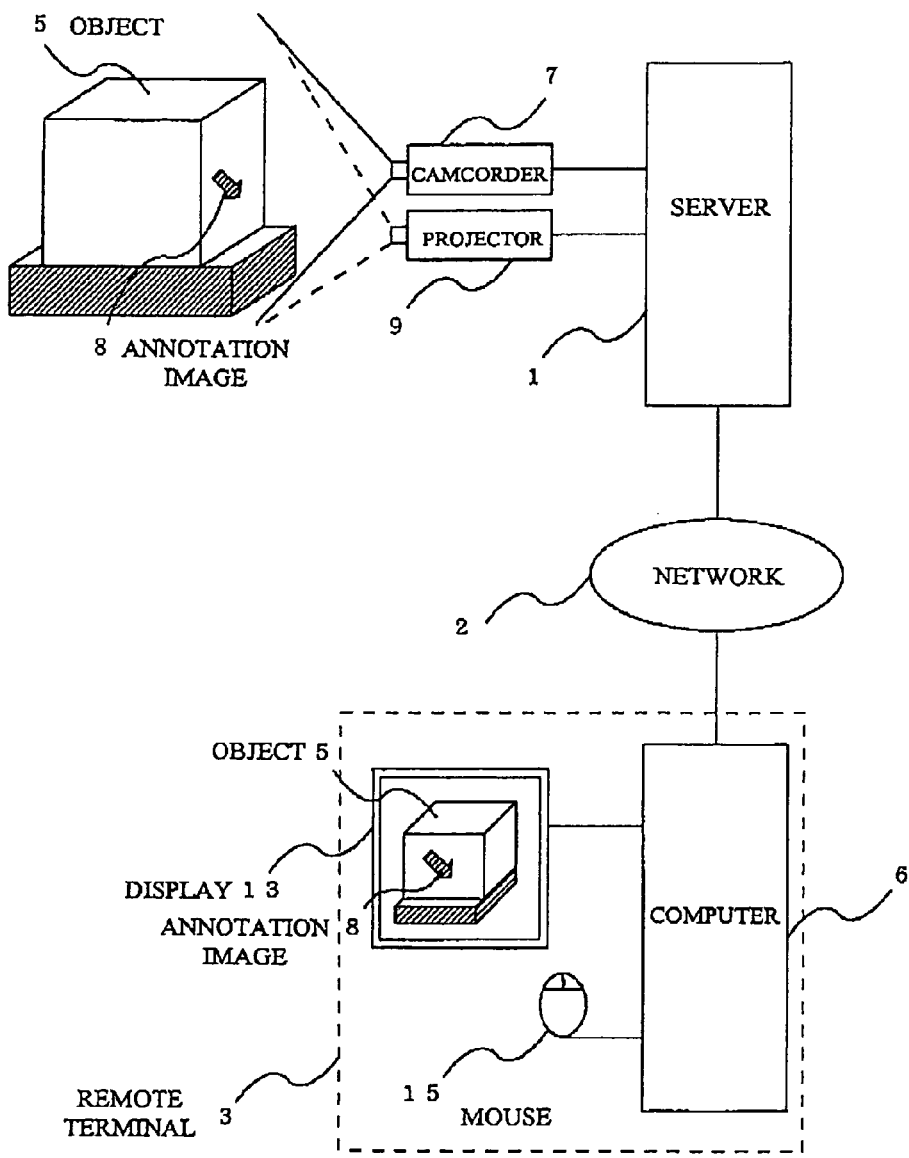
FIG. 1 schematically shows a remote instruction system according to an aspect of the present invention.
Figure 2:
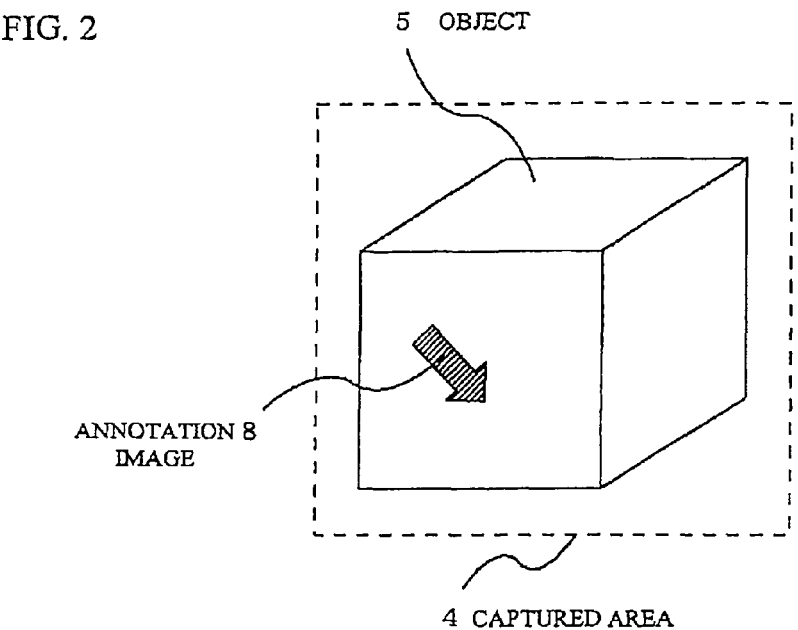
FIG. 2 is a view of an annotation image projected onto an object.
Figure 3:
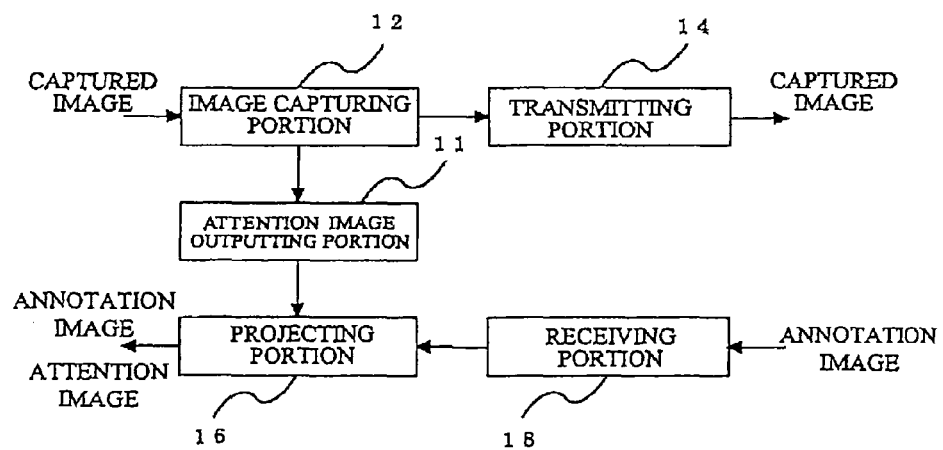
FIG. 3 is a functional block diagram of a server.

FIG. 1 schematically shows a remote instruction system according to an aspect of the present invention. FIG. 2 is a view of an annotation image 8 projected onto an object 5. FIG. 3 is a functional block diagram of a server 1. Referring to FIG. 1, the remote instruction system includes: the server 1; and a remote terminal 3 connected through a network 2 to the server 1. The server 1 is provided with: a camcorder 7 serving as an image capturing portion that captures an image of an object 5; and a projector 9 serving as a projecting portion that projects the annotation image 8 onto the object 5. The annotation image 8 includes any type of image such as a line, character, drawing, and the like.

Meanwhile, the remote terminal 3 includes: a display 13 that displays the image captured by the camcorder 7; and a mouse 15 used for giving an instruction to project the annotation image 8 to the object 5. The annotation image 8 is projected onto the object 5 located in a captured area 4, as shown in FIG. 2.

Referring now to FIG. 3, the server 1 is provided with: a capturing portion 12 that controls the camcorder 7; and a transmitting portion 14 that transmits the image captured by the camcorder 7 to the remote terminal 3. The server 1 is also provided with: a receiving portion 18 that receives the annotation image 8; and a projecting portion 16 that controls the projector 9 to make the annotation image 8 project. The server 1 is also provided with an attention image outputting portion 11 that outputs an attention image 10 to the projecting portion 16.

A description will now be given of the operation of the remote instruction system configured as described above. The captured image of the object 5 captured by the camcorder 7 is transmitted from the server 1 through the network 2 to the remote terminal 3. Then, the captured image is displayed on the display 13. This allows an operator who operates the remote terminal 3 to give an instruction to draw a desired annotation image 8 by means of the mouse 15, according to the captured image displayed on the display 13.

The annotation image 8 instructed by the mouse 15 is transmitted from the remote terminal 3 through the network 2 to the server 1, and the annotation image 8 is projected onto the object 5 by the projector 9. While the annotation image 8 is being projected or after the annotation image 8 is projected, an attention image 10 is projected onto the object 5 by the projector 9.

Figure 4:
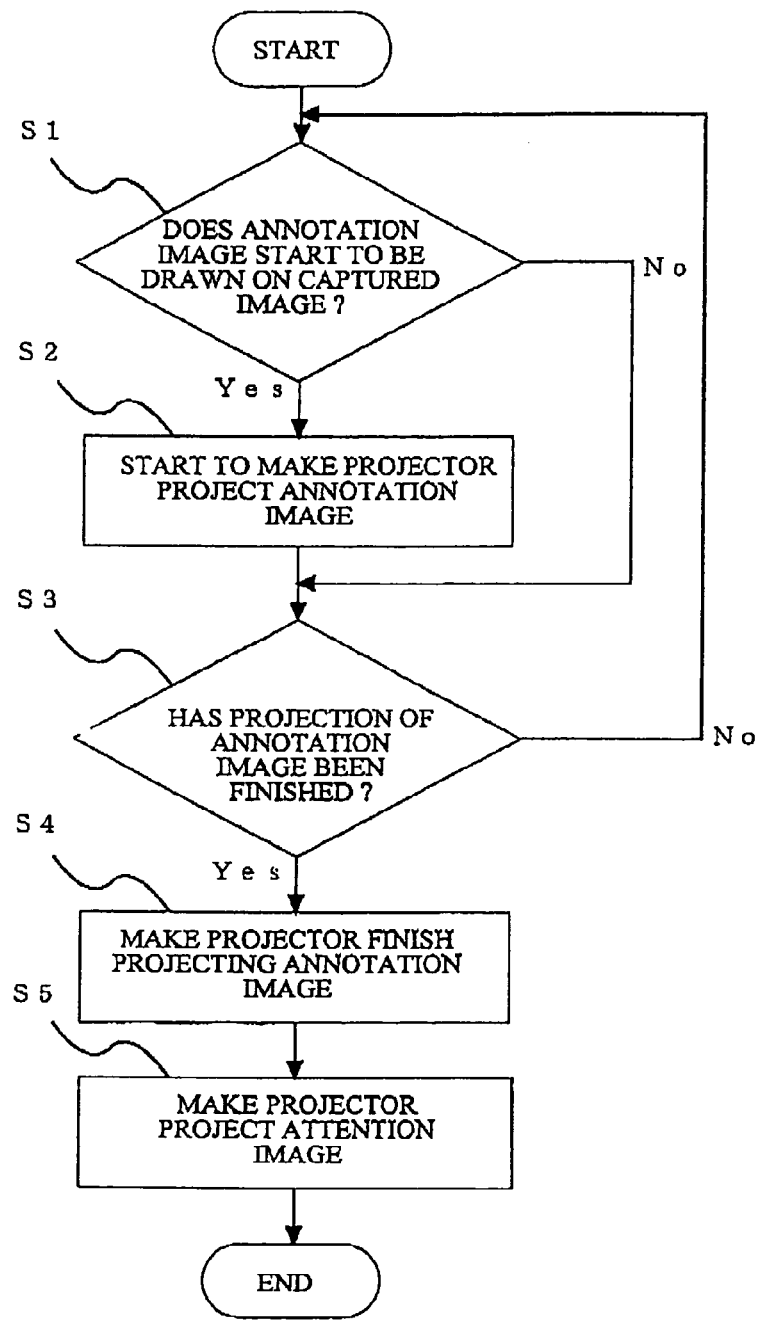
FIG. 4 is a flowchart showing an operation of an attention image outputting portion provided in the server.

FIG. 4 is a flowchart showing an operation of the attention image outputting portion 11 provided in the server 1. Firstly, the attention image outputting portion 11 determines whether or not the annotation image 8 starts to be drawn on the captured image (S1). If the annotation image 8 is drawn on the captured image (S1: Yes), the attention image outputting portion 11 makes the projector 9 start projecting the annotation image 8 (S2). If the annotation image 8 is not drawn on the captured image (S1: No), step S2 is skipped.

Next, the attention image outputting portion 11 determines whether or not the annotation image 8 is finished drawing on the captured image (S3). If the annotation image 8 is finished drawing on the captured image (S3: Yes), the attention image outputting portion 11 makes the projector 9 stop projecting the annotation image 8 (S4), and makes the projector 9 start projecting the attention image 10 (S5). Meanwhile, if the annotation image 8 is not finished drawing on the captured image (S3:No), processing returns to step S1.

Figure 5:
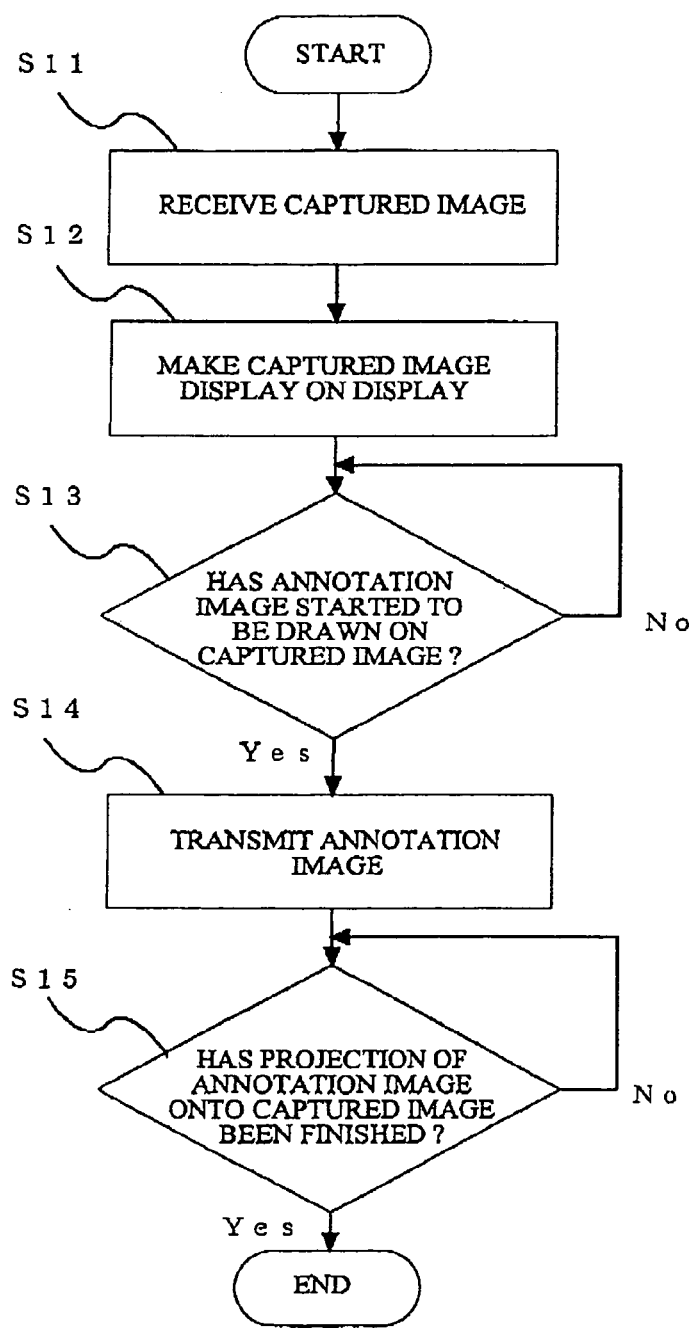
FIG. 5 is a flowchart showing the operation of a remote terminal.

FIG. 5 is a flowchart showing the operation of the remote terminal 3. Upon receiving the captured image (S11), the remote terminal 3 displays the captured image on the display 13 (S12). Next, if the annotation image 8 is drawn on the captured image (S13: Yes), the remote terminal 3 transmits the annotation image 8 to the server 1 (S14). If not (S13: No), the remote terminal 3 waits until the annotation image 8 is drawn. The annotation image 8 is transmitted until the annotation image 8 is finished drawing (S15: No). When the annotation image 8 is finished drawing (S15: Yes), the remote terminal 3 finishes processing.

Figure 6A:
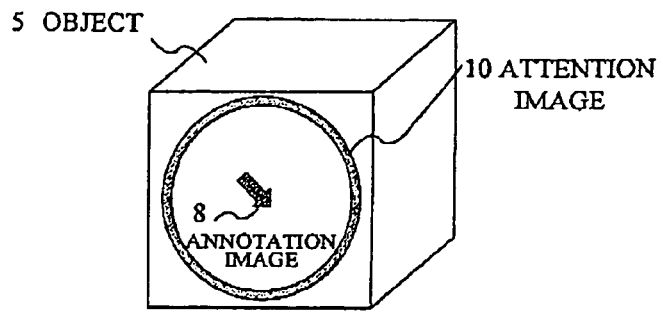
FIG. 6A through FIG. 6D show an exemplary embodiment of the method of projecting an attention image.
Figure 6B:
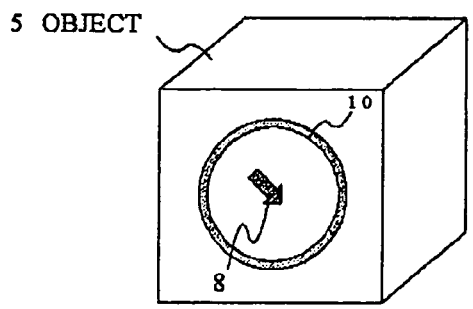
Figure 6C:
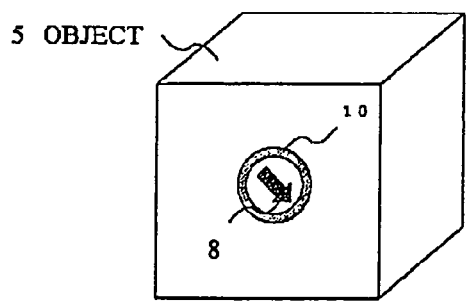
Figure 6D:
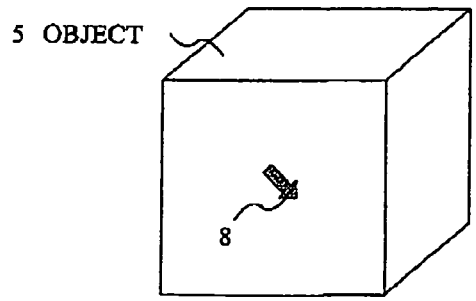

The attention image 10 projected onto the object 5 by the attention image outputting portion 11 may be the images shown in FIG. 6A through FIG. 10. FIG. 6A through FIG. 6D show an exemplary embodiment of the method of projecting the attention image 10. Firstly, as shown in FIG. 6A, the attention image outputting portion 11 displays the attention image 10 to wholly include the annotation image 8. Next, as shown in FIG. 6B, the attention image 10 is projected to gradually concentrate on the annotation image 8. Then, as shown in FIG. 6C, the attention image 10 is projected to get closer to the annotation image 8. Lastly, as shown in FIG. 6D, the attention image 10 is stopped projecting to prevent the attention image 10 from continuing being projected. The attention image outputting portion 11 performs the above-described processing of changing an output state, while the attention image is being output. This makes the annotation image 8 noticeable.

Figure 7:
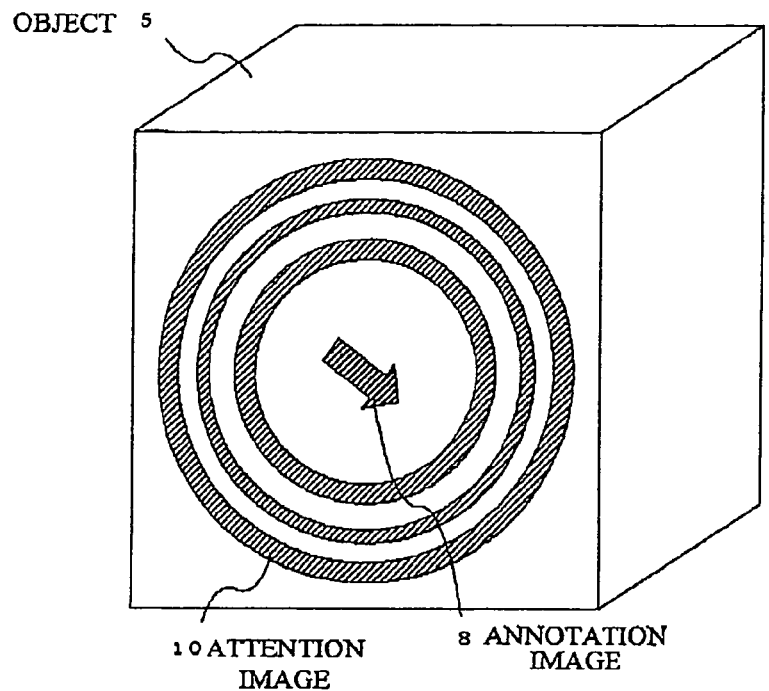
FIG. 7 shows an alternative exemplary embodiment of the method of projecting the attention image.
Figure 8:
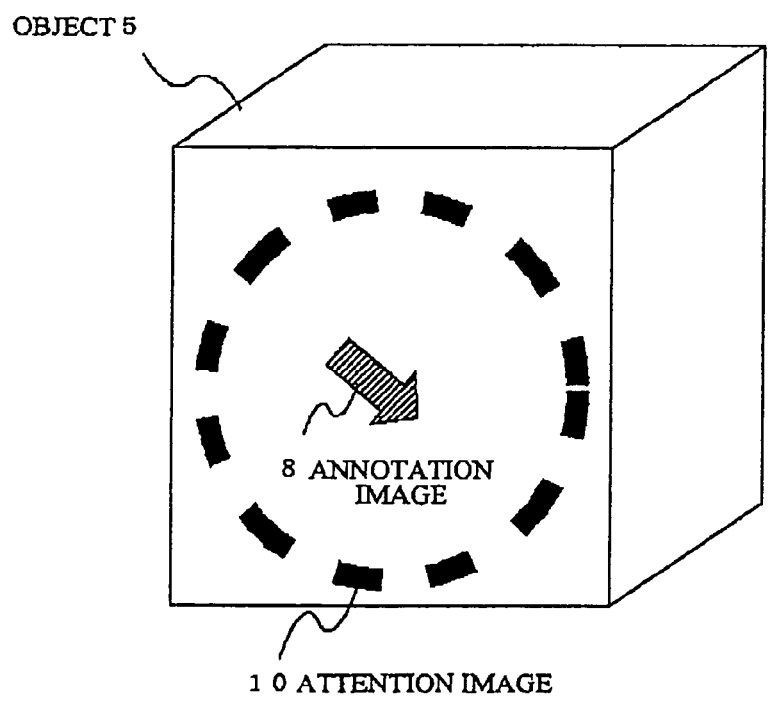
FIG. 8 shows an alternative exemplary embodiment of the method of projecting the attention image.
Figure 9:
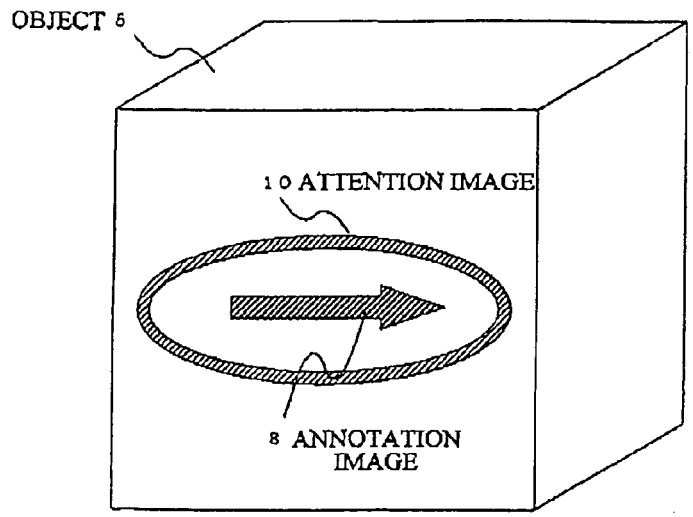
FIG. 9 shows an alternative exemplary embodiment of the method of projecting the attention image.

FIG. 7 and FIG. 8 show alternative exemplary embodiments of the method of projecting the attention image 10. The attention image 10 may be composed of triple circles, as shown in FIG. 7, or may be, for example, composed of a dotted line, as shown in FIG. 8. The method of projecting the attention image 10 is not limited to the afore-described ones. FIG. 9 also shows an alternative method of projecting the attention image 10. If the shape of the annotation image 8 to be output is, for example, horizontally long, the attention image 10 may be projected in accordance with the shape of the annotation image 8. In the afore-mentioned case, it is desirable that the horizontal to vertical ratio of the attention image 10 should be determined by that of the annotation image 8.

Figure 10:
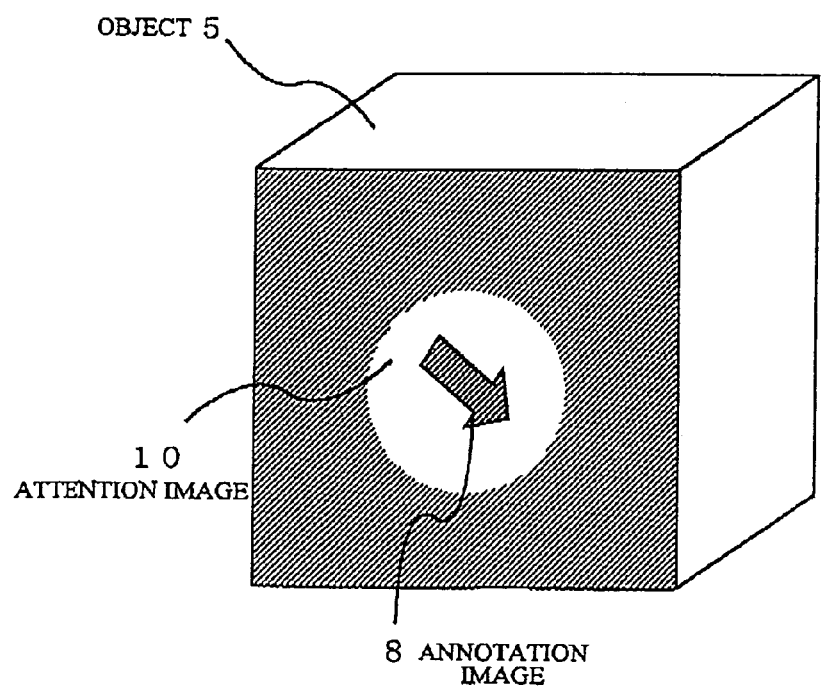
FIG. 10 shows an alternative exemplary embodiment of the method of projecting the attention image.

FIG. 10 also shows an alternative method of projecting the attention image 10. The attention image 10 may overlap the annotation image 8. Such projection can make the annotation image 8 noticeable. The output state of the attention images shown in FIG. 7 through FIG. 10 may be changed while the attention images are being projected.

Figure 11:
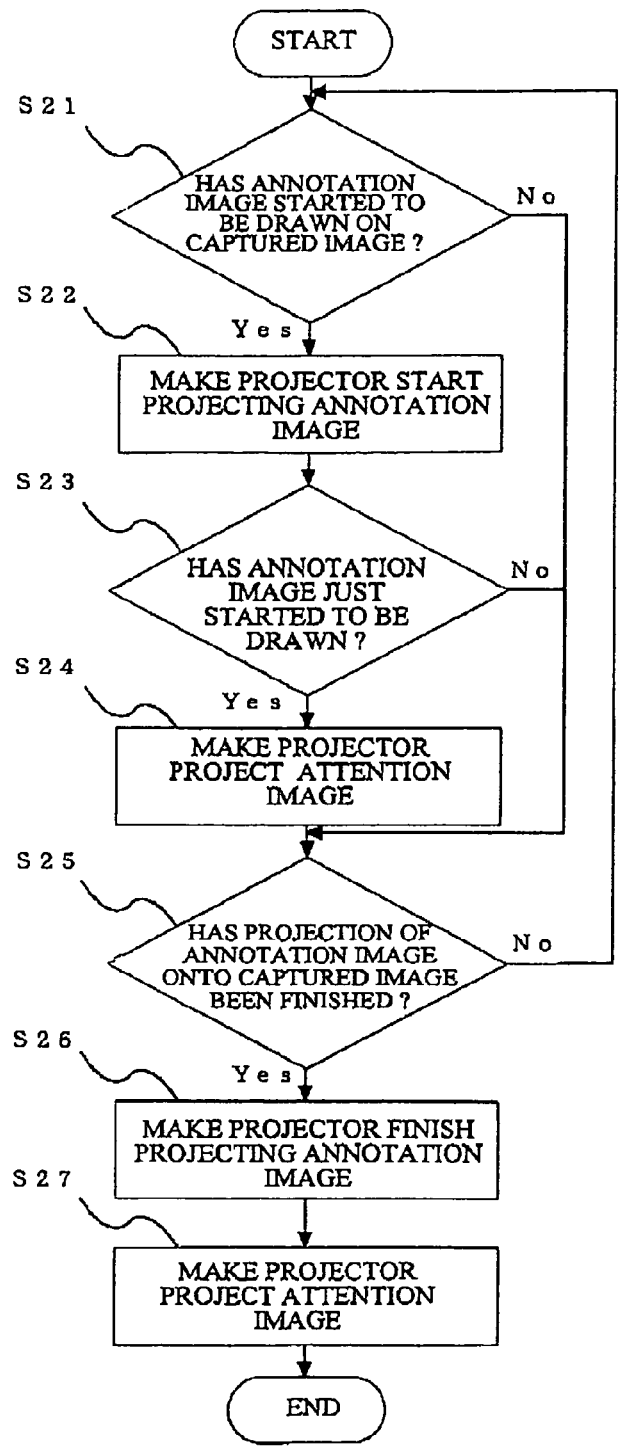
FIG. 11 is an alternative flowchart showing the operation of the attention image outputting portion provided in the server.

FIG. 11 is a flowchart showing an alternative operation of the attention image outputting portion 11. In FIG. 11, firstly, the attention image outputting portion 11 determines whether or not the annotation image 8 has started to be drawn on the captured image (S21). If the annotation image 8 has started to be drawn on the captured image (S21: Yes), the attention image outputting portion 11 makes the projector 9 start projecting the annotation image 8 (S22). Next, the attention image outputting portion 11 determines whether or not the annotation image 8 has just started to be drawn (S23). If the annotation image 8 has just started to be drawn (S23: Yes), the attention image outputting portion 11 makes the projector 9 project the attention image 10 (S24). If the annotation image 8 is not drawn on the captured image (S21: No), steps S22, S23, and S24 are skipped. If the annotation image 8 has not just started to be drawn, step S24 is skipped.

Next, the attention image outputting portion 11 determines whether or not the annotation image 8 is finished drawing on the captured image (S25). If the annotation image 8 is finished drawing on the captured image (S25: Yes), the attention image outputting portion 11 makes the projector 9 finish projecting the annotation image 8 (S26), and makes the projector 9 start projecting the attention image 10 (S27). Meanwhile, if the annotation image 8 is not finished drawing on the captured image (S25: No), processing returns to step S21.

Figure 12A:
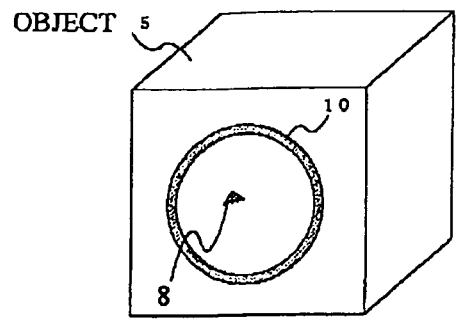
FIG. 12A through FIG. 12D show an alternative exemplary embodiment of the method of projecting the attention image.
Figure 12B:
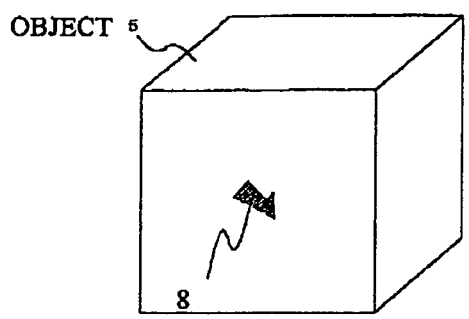
Figure 12C:
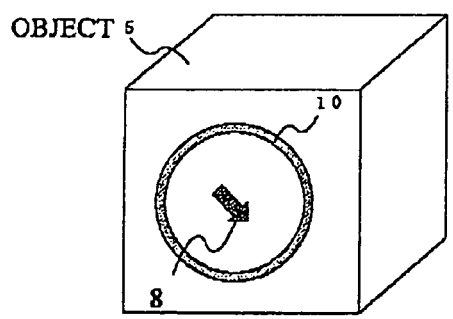
Figure 12D:
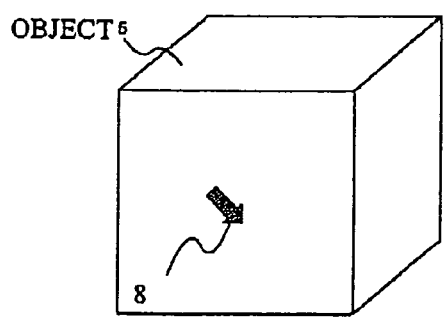

Specifically, referring now to FIG. 12A, the attention image outputting portion 11 projects the attention image 10, when the annotation image 8 starts to be projected. While the annotation image 8 is being drawn, the attention image 10 is not projected as shown in FIG. 12B. When the annotation image 8 is finished drawing, the attention image 10 is displayed again as shown in FIG. 12C. Then, the attention image 10 is stopped projecting lastly, as shown in FIG. 12D. In this manner, the attention image 10 is projected not only when the annotation image 8 is finished drawing but also when the annotation image 8 starts to be drawn.

Figure 13:
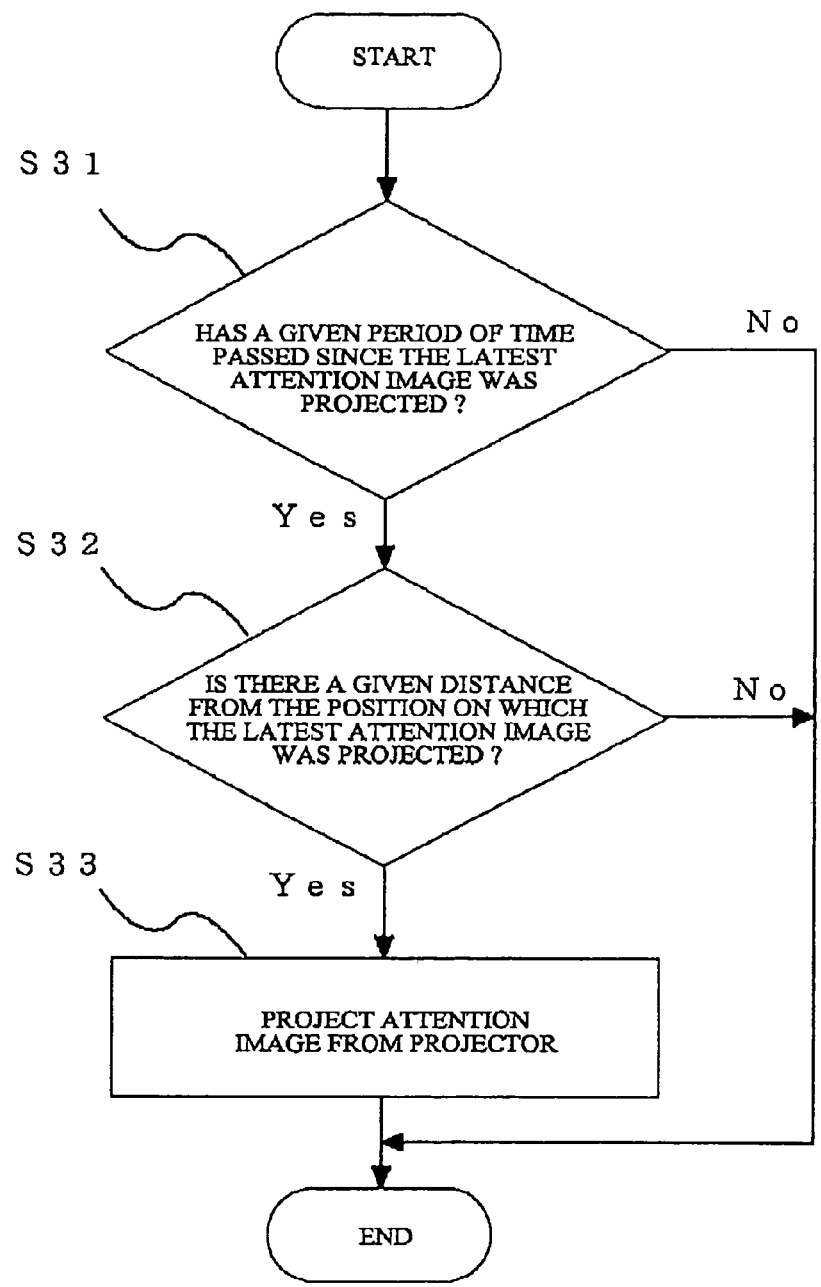
FIG. 13 is an alternative flowchart showing the operation of the attention image outputting portion provided in the server.

FIG. 13 is a flowchart showing an alternative operation of the attention image outputting portion 11. FIG. 13 shows another exemplary embodiment of processing at step S4 and step S5 shown in FIG. 4 or at step S24 and S27 shown in FIG. 11. At step S5, for example, after making the projector 9 finish projecting the annotation image 8, the attention image outputting portion 11 makes the projector 9 start projecting the attention image 10. In the flowchart of FIG. 13, however, after a given period of time has passed since the latest attention image 10 was projected (S31: Yes) and when there is a given distance apart from the position on which the latest attention image 10 is projected (S32: Yes), the attention image outputting portion 11 makes the projector 9 start projecting the attention image 10 (S33).

Figure 14A:
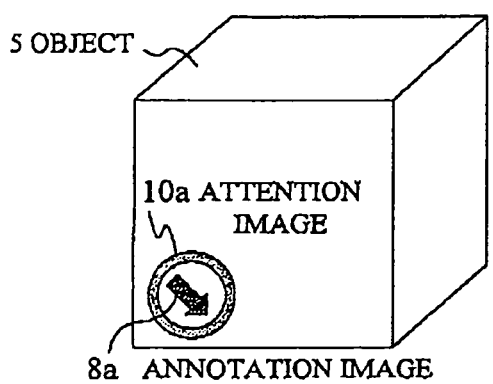
FIG. 14A through FIG. 14C show an alternative exemplary embodiment of the method of projecting the attention image.
Figure 14B:
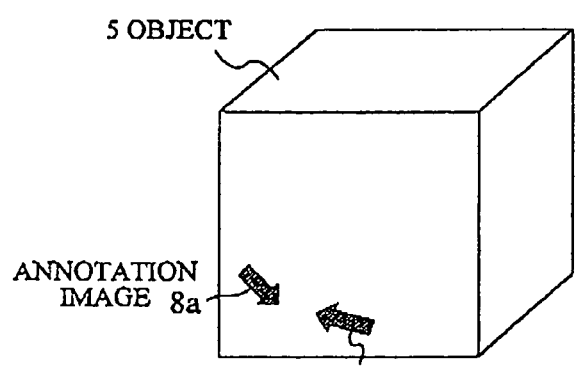
Figure 14C:
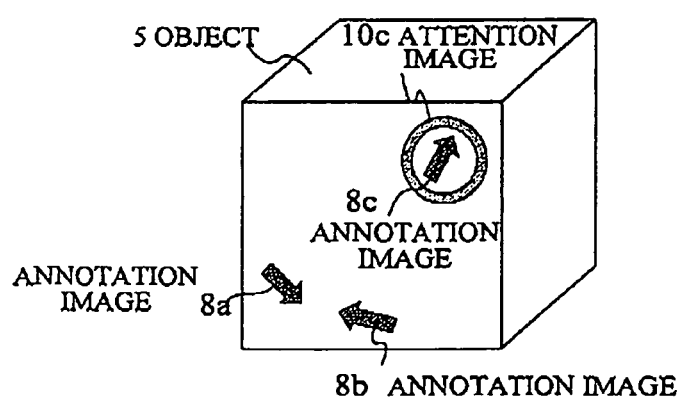

Specifically, a description will be given with reference to FIG. 14A through FIG. 14C. When the annotation images 8a through 8c are continuously projected onto the object 5, every time the annotation image is added in FIG. 14A through FIG. 14C, the attention image 10 is projected, resulting in an excessive projection of the attention image 10. This may annoy the viewer of the annotation images 8a through 8c. In order to avoid such annoyance, it is configured to project the attention image 10 after a given period of time has passed since the latest annotation image 8 was projected. The viewer of the annotation image 8 does not feel annoyance any longer. In FIG. 14A, the first annotation image 8a is drawn and the attention image 10a is projected. Next, in FIG. 14B, when the annotation image 8b is drawn within a given period of time, the attention image is not projected to avoid the excessive projection. Then, when the annotation image 8c is drawn after a given period of time has passes since the annotation image 8a was projected as shown in FIG. 14C, the attention image 10c is projected.

Figure 15A:
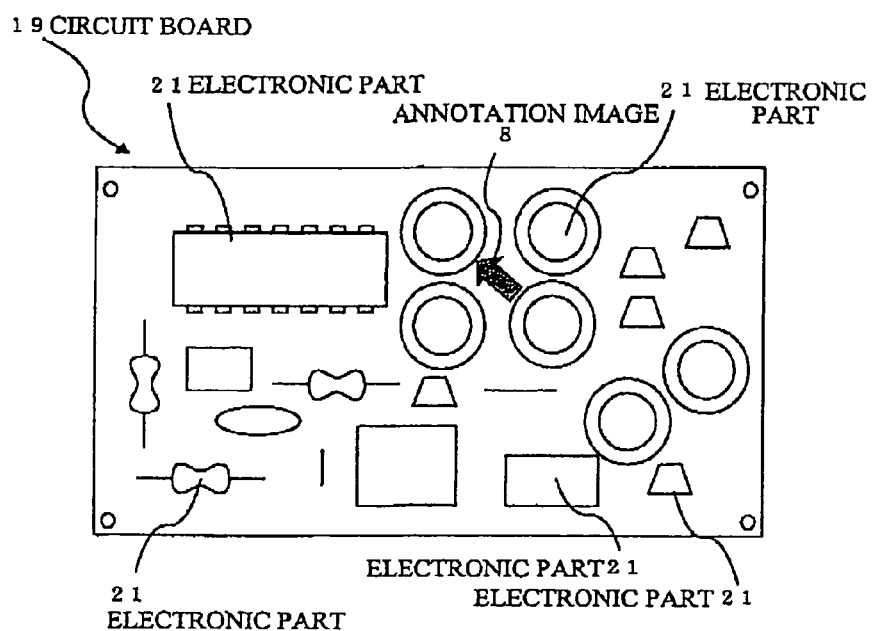
FIG. 15A and FIG. 15B schematically show circuit boards on which electronics parts are mounted.
Figure 15B:
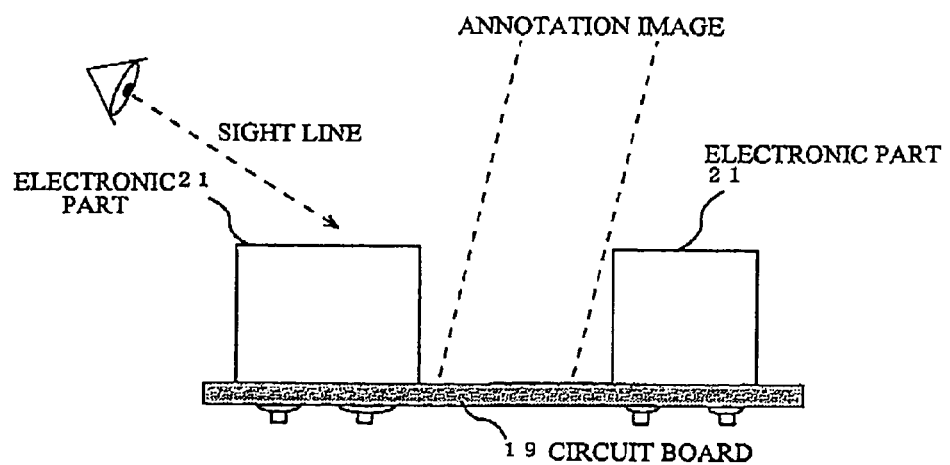

Next, a description will be given of a case where the object 5 has a complex structure. FIG. 15A is a plane view of a circuit board 19 on which electronics parts 21 are mounted. If the object 5 is a circuit board 19 in this manner, the annotation image 8 is projected between the electronics parts 21 as shown in FIG. 15B. In this case, the electronics part 21 possibly blocks the sight line to the annotation image 8. This makes the viewer of the annotation image 8 difficult to find the projection position of the annotation image 8.

Figure 16A:
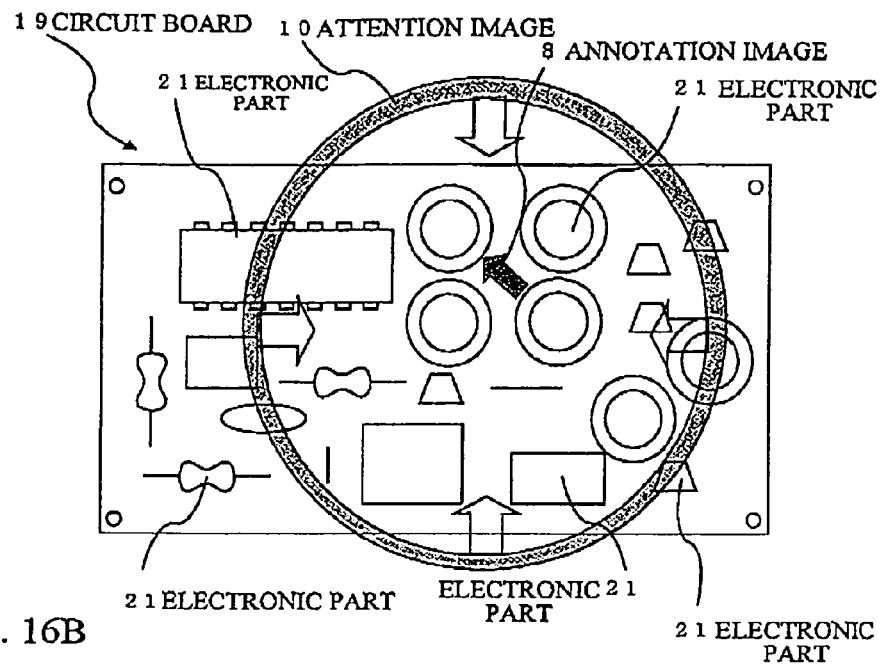
FIG. 16A and FIG. 16B show an alternative exemplary embodiment of the method of projecting the attention image.
Figure 16B:
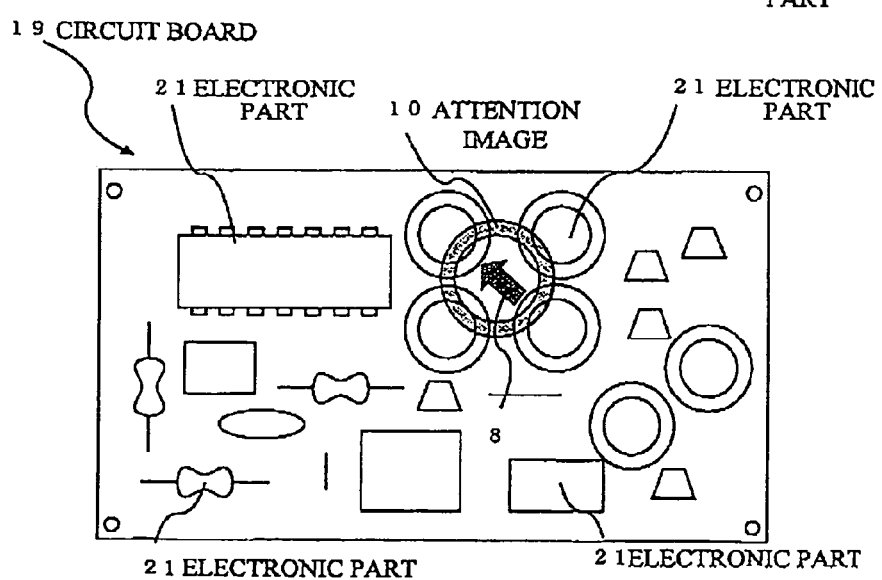

Referring now to FIG. 16A and FIG. 16B, the attention image 10 is moved and concentrated on the annotation image 8. There is advantage for the viewer of the annotation image 8 to be able to realize the position instructed by the annotation image 8 with ease.

If the object 5 is the circuit board 19 as described above, the attention image outputting portion 11 is capable of analyzing the complexity of the image captured by the camcorder 7 by means of differential histogram or the like, and changing the shape of the attention image 10 to be output according to the analysis results. For example, if the attention image 10 is a circle, it is desirable to change the number of the circles, to change the radius thereof in starting drawing, or to change the thickness thereof.

Figure 17:
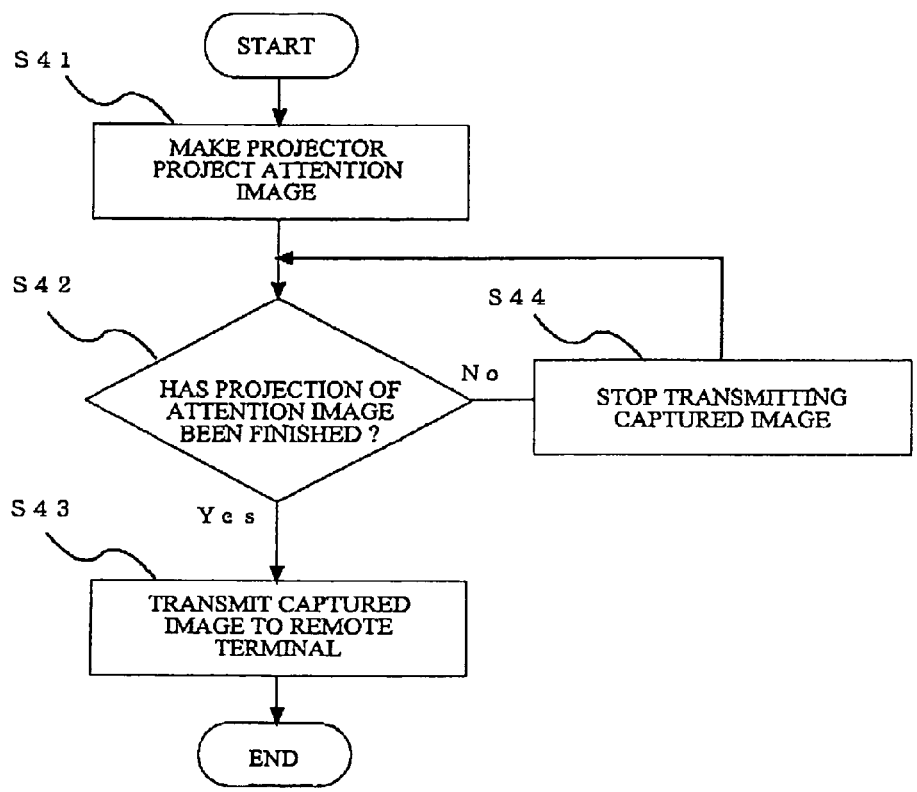
FIG. 17 is an alternative flowchart showing the operation of the attention image outputting portion provided in the server.

FIG. 17 is a flowchart showing an alternative operation of the attention image outputting portion 11, when the remote terminal 3 is connected to the server 1. FIG. 17 shows another exemplary embodiment of the processing at step S5 shown in FIG. 4 or at step S24 and S27 shown in FIG. 11. At step S5, for example, after making the projector 9 finish projecting the annotation image 8, the attention image outputting portion 11 makes the projector 9 start projecting the attention image 10. In the flowchart of FIG. 17, however, the attention image outputting portion 11 makes the projector 9 project the attention image 10 (S41), while the attention image 10 is being projected (S42: No), the captured image is stopped transmitting (S44). After the projection of the attention image 10 is finished (S42: Yes), the captured image starts to be transmitted again (S43).

Figure 18A:
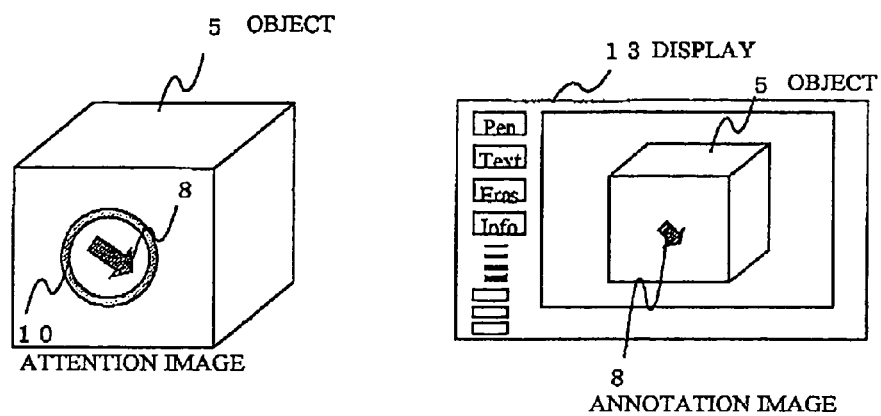
FIG. 18A and FIG. 18B are display examples on a display at a remote terminal.
Figure 18B:
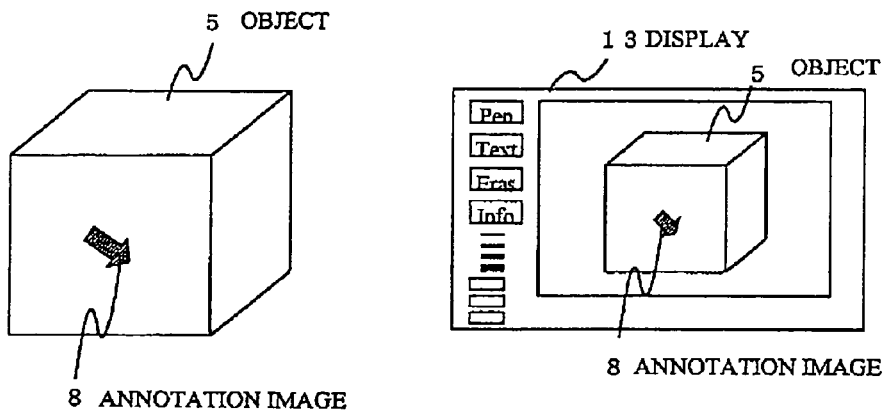

Specifically, the attention image 10 is projected onto the annotation image 8 projected onto the object 5. Referring to FIG. 18A, if the attention image 10 is being projected and the projection of the attention image 10 has not finished, the image is not transmitted to the display 13 at a remote site. The captured image of the object 5 onto which the attention image 10 is projected is not displayed, and the captured image of the object 5 onto which only the annotation image 8 is projected is displayed. Referring to FIG. 18B, the projection of the attention image 10 onto the object 5 is finished, and the captured image is transmitted to the display 13 and displayed. By performing the afore-mentioned process, the captured image needs not to be transmitted to the remote terminal, while the attention image 10 is being projected, thereby reducing the load over the network.

Figure 19A:
FIG. 19A and FIG. 19B are alternative display examples on a display at a remote terminal.
Figure 19B:
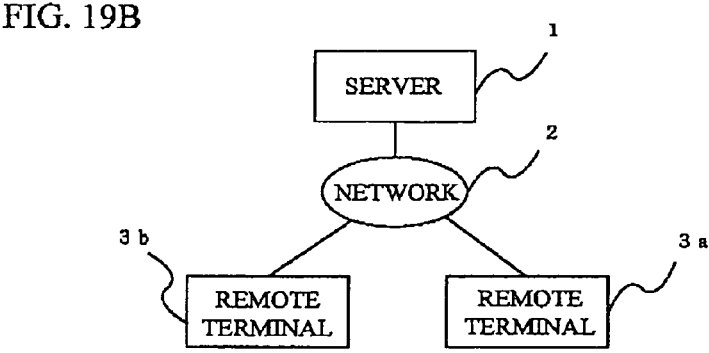
Figure 19B:
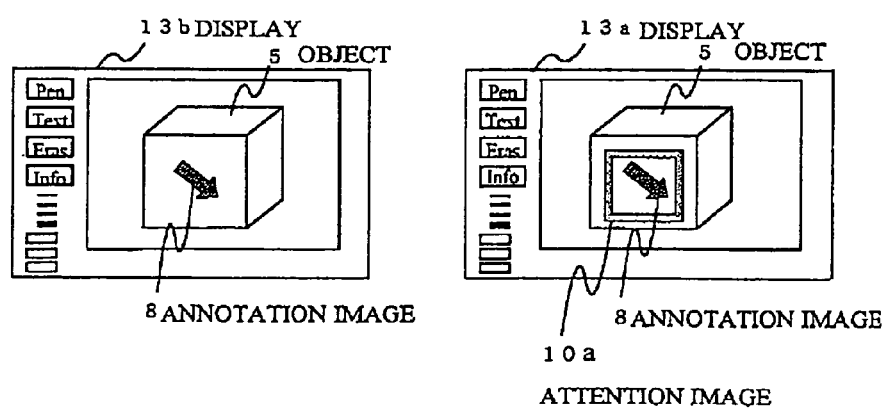

Referring now to FIG. 19A and FIG. 19B, a description will be given of a case where multiple remote terminals 3 are connected in the remote instruction system. FIG. 19A illustrates the annotation image 8 projected onto the object 5. FIG. 19B illustrate displays 13a and 13b respectively provided for remote terminals 3a and 3b.

As shown in FIG. 19B, the attention image outputting portion 11 is capable of not displaying the attention image 10 on the remote terminal 3b by which the annotation image 8 is instructed to project, and is capable of displaying the attention image 10 on the remote terminal 3a by which the annotation image 8 is not instructed to project. The remote terminal 3b that gives an instruction to project the annotation image 8 is capable of recognizing the position of the object 5 to be instructed to project the annotation image 8, thereby eliminating the necessity of displaying the attention image 10. The remote terminal 3a that does not give an instruction to project the annotation image 8 is not capable of recognizing the position of the object 5 to be instructed by the remote terminal 3b. An attention image 10a needs to be displayed on the remote terminal 3a. The attention image outputting portion 11 displays the attention image 10a on the remote terminal 3a by which an instruction to project the annotation image 8 is not given, thereby making the annotation image 8 projected on the captured image noticeable on the remote terminal 3a. The attention image 10a displayed on the remote terminal is not necessarily identical to the captured attention image. For example, as shown in display 13a, a rectangular attention image 10a may be displayed whereas a circular attention image 10 is being projected.

Figure 20:
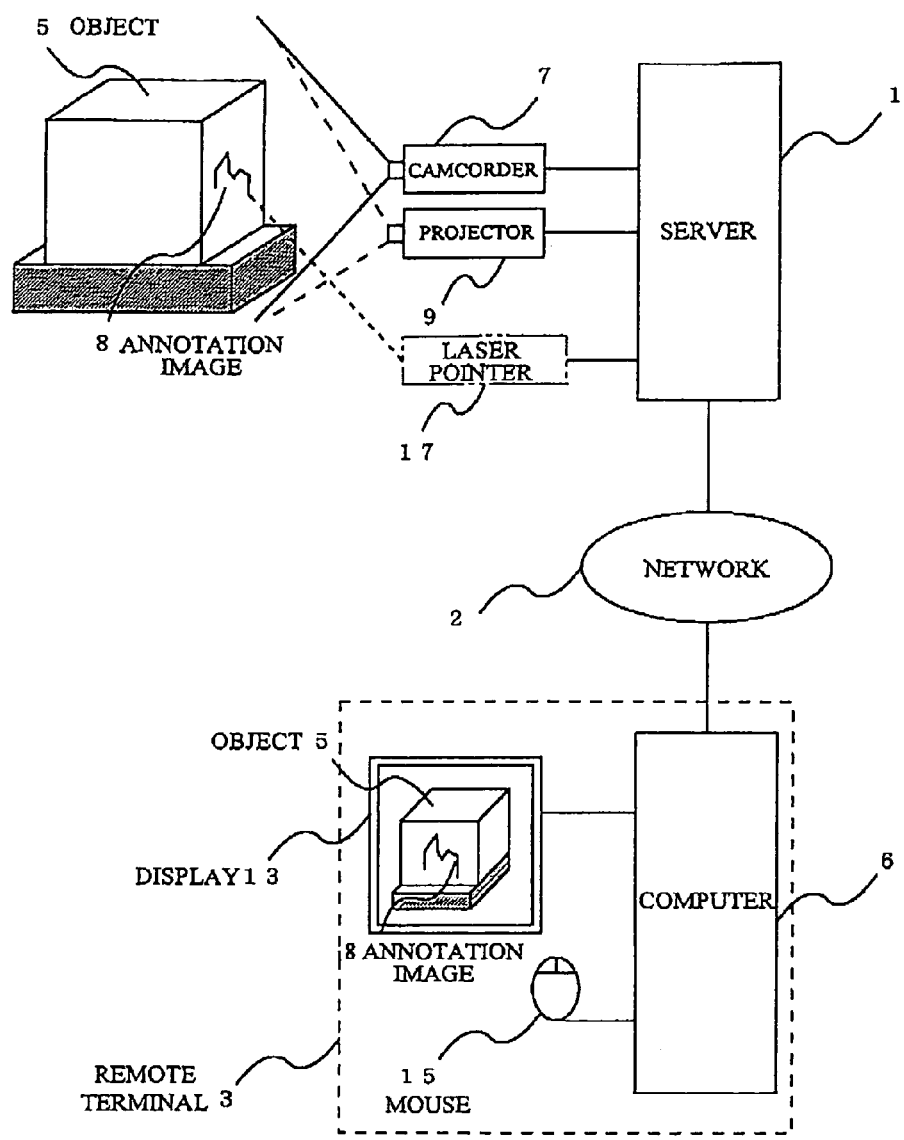
FIG. 20 schematically shows the remote instruction system in which a laser pointer is connected.

FIG. 20 schematically shows the remote instruction system in which a laser pointer 17 is connected. By use of the laser pointer 17, the annotation image 8 is directly projected onto the object 5, and the attention image 10 is projected onto the annotation image 8. Specifically, the trajectory of the laser made by the laser pointer 17 is captured by the camcorder 7, and the annotation image 8 is projected onto the object 5 according to the captured image. Also, the attention image 10 is projected onto the object 5 according to the annotation image 8.

It should be appreciated that modifications and adaptations to those exemplary embodiments may occur to one skilled in the art without departing from the scope of the present invention. For example, in the abode-described exemplary embodiments, the attention image outputting portion 11 is provided in the server 1. The attention image outputting portion 11, however, may be provided in the remote terminal 3, whereas the attention image outputting portion 11 in the server 1 applies the less network load than that provided in the remote terminal 3. A remote instruction method employed as an aspect of the present invention is realized with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote instruction system comprising:
   a server being provided with:
      an image capturing portion that captures an image of an object;
      a transmitting portion that transmits the image of the object to a remote terminal over a network;
      an attention image outputting portion that causes output of an annotation image, the annotation image being created on the basis of the captured image and being drawn on the captured image at the remote terminal, the annotation image being transmitted to the server, the attention image outputting portion further outputting an attention image, the attention image being configured to attract attention to the annotation image, the attention image outputting portion determining a shape of the attention image according to a shape of the annotation image; and a projecting portion that causes projection of the attention image and the annotation image onto an area of the object, wherein the attention image outputting portion determines if the annotation image is projected onto the object, and the attention image outputting portion causes the attention image to be projected onto the object in response to the annotation image being drawn on the captured image.

2. The remote instruction system according to claim 1, wherein an output state of the annotation image includes a projecting sequence of the annotation image, the attention image outputting portion projecting an attention image according to a projecting annotation image, and after a given period of time passes, projecting a different attention image according to a different projecting annotation image projected later.

3. The remote instruction system according to claim 2, wherein the output state of the annotation image further includes a projecting position of the annotation image, the attention image outputting portion projecting the different attention image according to the different projecting annotation image, after the given period of time passes and when there is a given distance apart from a position on which the attention image according to the projecting annotation image is projected.

4. The remote instruction system according to claim 1, wherein an output state of the annotation image includes a structure of an area onto which the annotation image is projected, the attention image outputting portion forming the attention image according to the structure of the area onto which the annotation image is projected.

5. The remote instruction system according to claim 1, wherein the attention image is an image that non-contacts the annotation image.

6. The remote instruction system according to claim 1, wherein the attention image outputting portion projects the attention image without lapping over the annotation image.

7. The remote instruction system according to claim 1, wherein an output state of the annotation image includes a shape of the annotation image, the attention image outputting portion changing a shape of the attention image according to the change of the shape of the annotation image.

* * * * *